E. G. MINNEMAN.
PIE TRIMMER AND CRIMPER.
APPLICATION FILED AUG. 1, 1908.
912,709.
Patented Feb. 16, 1909.
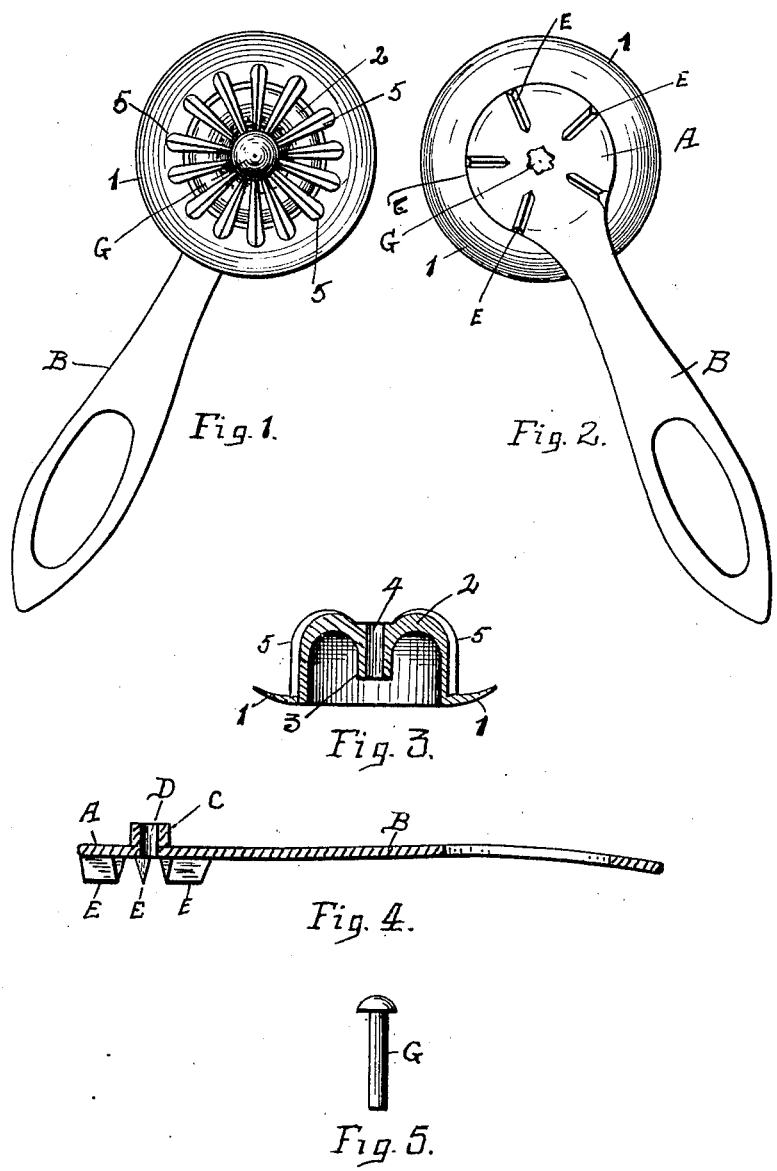
E. G. Minneman,
Inventor;
By Robert W. Randle,
Attorney.
Witnesses:

UNITED STATES PATENT OFFICE.

EDWARD G. MINNEMAN, OF RICHMOND, INDIANA.

PIE TRIMMER AND CRIMPER.

No. 912,709.

Specification of Letters Patent.

Patented Feb. 16, 1909.

Application filed August 1, 1908. Serial No. 446,491.

*To all whom it may concern:*

Be it known that I, EDWARD G. MINNEMAN, a citizen of the United States, residing at Richmond, in the county of Wayne and State of Indiana, have invented certain new and useful Improvements in Pie Trimmers and Crimpers, of which the following is a full, clear, and comprehensive specification, being such as will enable others to make and use the same with absolute exactitude.

This invention has relation to a pastry tool, particularly intended for use in making pies or the like, and the objects of my invention are; to provide a pie trimmer and crimper which will be neat and attractive in appearance, strong and durable in construction, easily operated and controlled, and which can be manufactured and sold at a comparatively low price.

A further object is to provide a device of the character stated which will produce a plurality of results, certain operations thereof being attained simultaneously.

Other objects and particular advantages of my invention will be made apparent in the course of the following description.

The preferred manner for the construction of my invention, and that which in practice I have found to be the most desirable, is shown most clearly in the accompanying drawings, in which,—

Figure 1 is a face view of my invention complete. Fig. 2 is a back or rear view of the invention. Fig. 3 is a central cross section taken through one of the two essential members of the device. Fig. 4 is a central longitudinal section taken through the other essential member. And Fig. 5 shows the axle for connecting the other two members of the device.

Similar indices denote like parts throughout the several views of the drawings.

In order that my invention may be more fully understood and its many advantages comprehended I will now take up a detail description thereof, in which I will refer to the parts and their relation to each other as briefly and as comprehensively as I may.

The numeral 1 denotes the cutter, which consists of a concavo-convex ring having a sharp peripheral edge, which member is denominated the cutter. Formed concentric and integral with the cutter 1 is a hollow cup-like roll 2 which rises from the concave side of the cutter and is in fact a continuation of the inner periphery of the cutter, with which it corresponds, as indicated most clearly in Fig. 3. Extending inward from the center of the roll 2 is a boss 3, which protrudes substantially half-way through the interior of the roll 2 and is integral therewith. An aperture 4 extends in an axial direction through the center of the roll 2 and the boss 3. Formed integral with the roll 2, radiating from the center thereof, and extending down to and uniting with the cutter 1, is a plurality of ridges 5, which ridges form the crimper.

Said cutter and crimper are mounted so that they may revolve, for which purpose I provide the following described construction:

The letter A denotes a disk, which is of such size as to contact with the convex side of the cutter and close the interior space of the roll 2, as indicated in Fig. 2. Extending out from the periphery of the disk A, and formed integral therewith, is a handle B. Extending from the center of the disk A, in an axial direction, is the boss C, which is such length as to contact with the boss 3 when the disk is in operative position. A central aperture D is formed through the disk A and the boss D, in an axial direction, which corresponds with and forms a continuation of the aperture 4. Extending out from the face of the disk A, and disposed around the center thereof, is a plurality of incisors E. The letter G designates the axle for connecting the two main members of the device, which axle is to be projected through the apertures 4 and D, the head of the axle resting in a depression therefor formed in the center of the outside of the roll 2 and around the aperture 4. After the parts are united then the small end of the axle may be riveted, or otherwise enlarged, as by a nut or the like, which will effectually retain the parts in operative position.

The operation of my invention is quite simple, as for instance: After the top crust of a pie has been placed in position then my device is brought into requisition and is run therearound, the handle being grasped by the operator, the inner face of the cutter 1 being held in shearing contact with the edge of the pan, while the ridges 5 travel on top of the dough which rests on the flange of the pan. As the cutter is pushed forward the ridges are impressed in the dough and form indentations, while the cutter trims the surplus dough away from outside the edge of the flange of the pan, thereby accomplishing two of the objects of my invention. For decorative effect the face of the device may be impressed in the dough, where desired, forming a rosette, which would appear similar to all that part of the device shown in Fig. 1, except the cutter 1 and the handle B. The rosette so formed appearing in intaglio. In like manner the other side of the device may be employed to cause the incisors E to cut into the dough, thereby forming an assemblage of radiating incisions in the dough, this is usually made in the top crust while the dough is resting on the dough-board.

Having now fully shown and described my invention and its intended operation, what I claim and desire to secure by Letters Patent of the United States, is—

1. A device of the class described comprising in combination, a disk having a handle formed integral therewith, a hollow roll revolubly mounted on the face of the disk by which the interior of the roll is closed by the disk, a concavo-convex cutter formed integral with said roll and extending out from around the edge thereof, a plurality of ridges formed around the roll in an axial direction and extending from said cutter to the center portion of the roll, bosses contacting with each other in the center portion of the roll, one of said bosses being integral with the roll and the other integral with said disk, and an axle extending centrally through said bosses, the roll, and the disk, for connecting the parts in operative position, all substantially as shown and described.

2. A device of the class described comprising a disk, a handle formed integral with the disk, a plurality of incisors projecting from the back of the disk, a roll mounted on the face of the disk, an axle connecting the roll and the disk, a circular cutter extending out from around the base of the disk, a plurality of ridges extending from the juncture of the roll and the cutter upward and inward to the center portion of the roll, all substantially as shown and described, for the purposes set forth.

In testimony whereof I have hereunto subscribed my name in the presence of two subscribing witnesses.

EDWARD G. MINNEMAN.

Witnesses:
ROBERT WHITE RANDLE,
R. E. RANDLE.